United States Patent [19]

Sinsley

[11] Patent Number: 5,271,888
[45] Date of Patent: Dec. 21, 1993

[54] CERAMIC LOG MOULDING PROCESS

[75] Inventor: Wayne A. Sinsley, Lisbon, Ohio

[73] Assignee: Specialty Management Group, Inc., Salem, Ohio

[21] Appl. No.: 833,480

[22] Filed: Feb. 10, 1992

[51] Int. Cl.$^5$ ............................................. C04B 33/28
[52] U.S. Cl. ........................................ 264/87; 264/86; 264/338; 249/55; 249/113
[58] Field of Search ............... 264/86, 87, 338; 249/55, 113

[56] References Cited

U.S. PATENT DOCUMENTS

| | | | |
|---|---|---|---|
| 1,492,555 | 5/1924 | Cooper | 249/113 |
| 2,779,058 | 1/1957 | Hyde | 249/55 |
| 3,377,229 | 4/1968 | Bryan | 264/87 |
| 4,209,486 | 6/1980 | Ross | 264/338 |
| 4,472,339 | 9/1984 | van der Ploeg | 249/113 |

*Primary Examiner*—James Derrington
*Attorney, Agent, or Firm*—Michael Sand Co.

[57] ABSTRACT

The present invention relates to an improved process and partible mold for forming a light-weight synthetic ceramic log for use in natural gas, propane and wood-burning fireplaces and stoves which are both fully-vented and non-vented depending upon the particular design of the heat generating equipment. In the subject process, a flexible porous patterned screen is formed simulating the exterior bark portion of a tree or log having a reverse image. Such screen is designed with both porous and non-porous surface characteristics for mounting as a separate element within the partible mold. The flexible porous patterned screen is mounted within the partible mold having major interior surface areas which are capable of connection to a vacuum source for withdrawing water from a liquid composition containing ceramic fibers to rapidly form the ceramic log within the mold during short periods of vacuum molding. After vacuum extraction of the liquid components of the molding composition containing multiple ceramic fibers, the partible mold is opened and the separable screen and newly-formed log are taken therefrom and separated, following which the synthetic log is dried to increase its structural strength for further handling and processing. The molding composition contains both finely-divided ceramic fibers such as aluminosilicate fibers and a colorant such as iron chromite to produce the ceramic log having a dark colorization. After the log is formed and dried, the log is then subjected to an additional colorizing operation to give its exterior surface areas greater colorization ranging from brown to gray to black depending upon the desired surface characteristics to be obtained.

12 Claims, 5 Drawing Sheets

CERAMIC LOG MOULDING PROCESS

BACKGROUND OF THE INVENTION

1. Technical Field

The present invention relates to an improved process and partible mold for vacuum molding a synthetic heat-resistant ceramic log for use in fireplaces and stoves.

2. Background Information

In various processes Which have been previously utilized for the manufacture of synthetic logs for use in natural gas, propane, and wood-burning fireplaces and stoves, such logs have heretofore been made of various types of high-temperature materials wherein the mold comprises an exterior shape around which the log is formed by drawing an interior vacuum around a pre-shaped sculpted pre-form. The high-temperature materials are usually deposited on the exterior of the pre-form. The pre-form is contained within the mold interior and a vacuum is drawn interiorly from within the pre-form to shape the simulated log on the exterior surface of the pre-form. Such logs are frequently made from various heat-resistant materials, such as ceramic fibers mixed with high-density materials of a cementitious nature, which are able to resist high-temperature conditions for relatively long periods of time without distortion or damage to the synthetic log. Such synthetic logs are normally made with finely-sculpted details which produce natural-looking fire effects simulating wood burning logs.

Open burning, which includes wood-burning fireplaces, is being increasingly prohibited due to regulations governing air pollution. In addition, the cost of natural wood for use in fireplaces and wood-burning stoves has been steadily increasing. Thus, the use of synthetic ceramic logs in such combustion environments using clean burning fuels is becoming increasingly important without the deleterious effects of natural wood-burning.

Synthetic logs have been made available in both natural gas and propane burning gas sets as well as for use in wood-burning fireplaces and stoves to simulate the effects of wood burning. Such logs have been formed of ceramic fibers which will withstand extremely high temperatures over lengthy periods of time and provide both heating and aesthetic effects. The logs normally consist of materials which are resistant to thermal shock and which will not crack, break or change color when heated over lengthy time periods. Such logs are frequently formed to glow with special effects where flame touches the logs. The ceramic logs may be used in fireplaces and stoves wherein a plurality of such members is arranged in a grate or burner pan which is normally fully vented. The logs are made with heat-resistant colors and of varying densities adapted to withstand continuous temperatures ranging from about 800° to 1600° F. without damage thereto. It is highly desirable that the logs have a low coefficient of thermal expansion and be capable of rapid thermal changes without appreciable thermal shock which will cause their cracking or breaking during both short-term and long-term heating cycles.

SUMMARY OF THE INVENTION

The present invention relates to an improved process of forming a light-weight synthetic ceramic log for use in natural gas, propane and wood-burning fireplaces and stoves which are both fully-vented and non-vented depending upon the particular design of the heat generating equipment. In the subject process, a flexible porous patterned screen is formed simulating the exterior bark portion of a tree having a reverse image. Such screen is designed with both porous and non-porous surface characteristics for mounting as a separate element within a partible mold. The flexible porous patterned screen is mounted within a partible mold having major interior surface areas which are capable of connection to a vacuum source for withdrawing water from a liquid composition containing ceramic fibers to rapidly form the ceramic log within the mold during short periods of vacuum molding. After extraction of the liquid components of the molding composition containing multiple ceramic fibers, the partible mold is opened and the separable screen and newly-formed log are taken therefrom and separated, following which the synthetic log is dried to increase its structural strength for further handling and processing. The molding composition contains both finely-divided ceramic fibers such as aluminosilicate fibers and a colorant such as iron chromite to produce the ceramic log having a dark coloration. After the log is formed and dried, the log is then subjected to an additional colorizing operation to give its exterior surface areas greater colorization ranging from brown to gray to black depending upon the desired surface characteristics to be obtained.

The partible mold containing the separable flexible porous patterned screen is immersed within a water-based composition containing finely-distributed ceramic fibers, the mold being connected to a vacuum source, especially in its lower portions for extracting water from the solution with the ceramic fibers being deposited within the mold.

A primary object of this invention is to provide an improved process and partible mold for vacuum forming a light-weight heat-resistant synthetic ceramic log simulating a natural log having bark-like major exterior surfaces which can be utilized in many varied types of heating appliances, which log provides the effects of wood-burning in the absence of natural wood.

Another object of the present invention is to provide a vacuum forming process which is both economical and simplified to form a heat-resistant synthetic log having the physical appearance of a natural log and which is made in various sizes and shapes to be used in plural sets to simulate a natural looking arrangement of real wood logs for use in a heating and/or aesthetically-appealing combustion environment.

BRIEF DESCRIPTION OF THE DRAWINGS

Preferred embodiments of the invention, illustrative of the best modes in which applicant has contemplated applying the principles of the invention, are set forth in the following description and are shown in the drawings and are particularly and distinctly pointed out and set forth in the appended claims.

Similar numerals refer to similar parts and elements throughout the drawings.

DESCRIPTION OF THE PREFERRED EMBODIMENTS

Figures 8, 9:
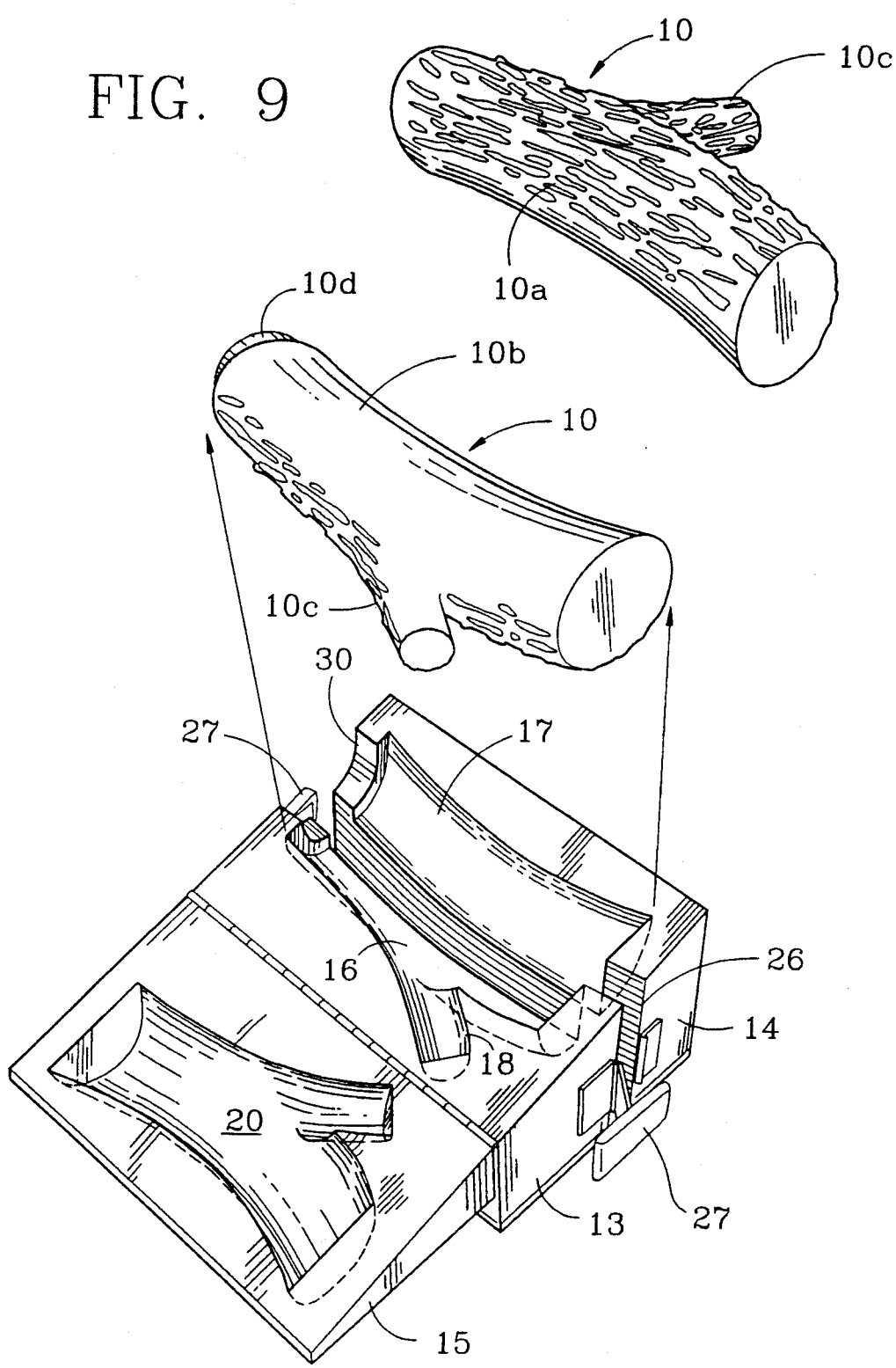
FIG. 8 is an exploded perspective view of the partible mold shown in FIG. 1 and the newly-formed ceramic log, the mold being fully open for removal of said log.
FIG. 9 is a perspective view of the reverse side of the newly-formed ceramic log shown in FIG. 8, the log being fully formed and finished in accordance with the invention.

In practicing this invention, it is highly-desirable and a unique feature of the invention to form the synthetic log having major exterior surfaces which simulate a naturally-occurring wood log. A section of a porous screen preferably made from synthetic plastic material is taken for forming a log molding element which is initially larger than the partible mold. A synthetic log 10 is shown in FIG. 9 in fully finished condition having major exterior surfaces which simulate a natural log. The log is basically cylindrical in shape with a limb-like side arm and essentially square ends. The synthetic log is vacuum molded in a partible hollow mold 11 as shown in FIG. 1 utilizing a flexible porous patterned screen 12 which is patterned having the physical features of a natural log and which is formed to fit closely within the partible mold 11.

Figure 1:
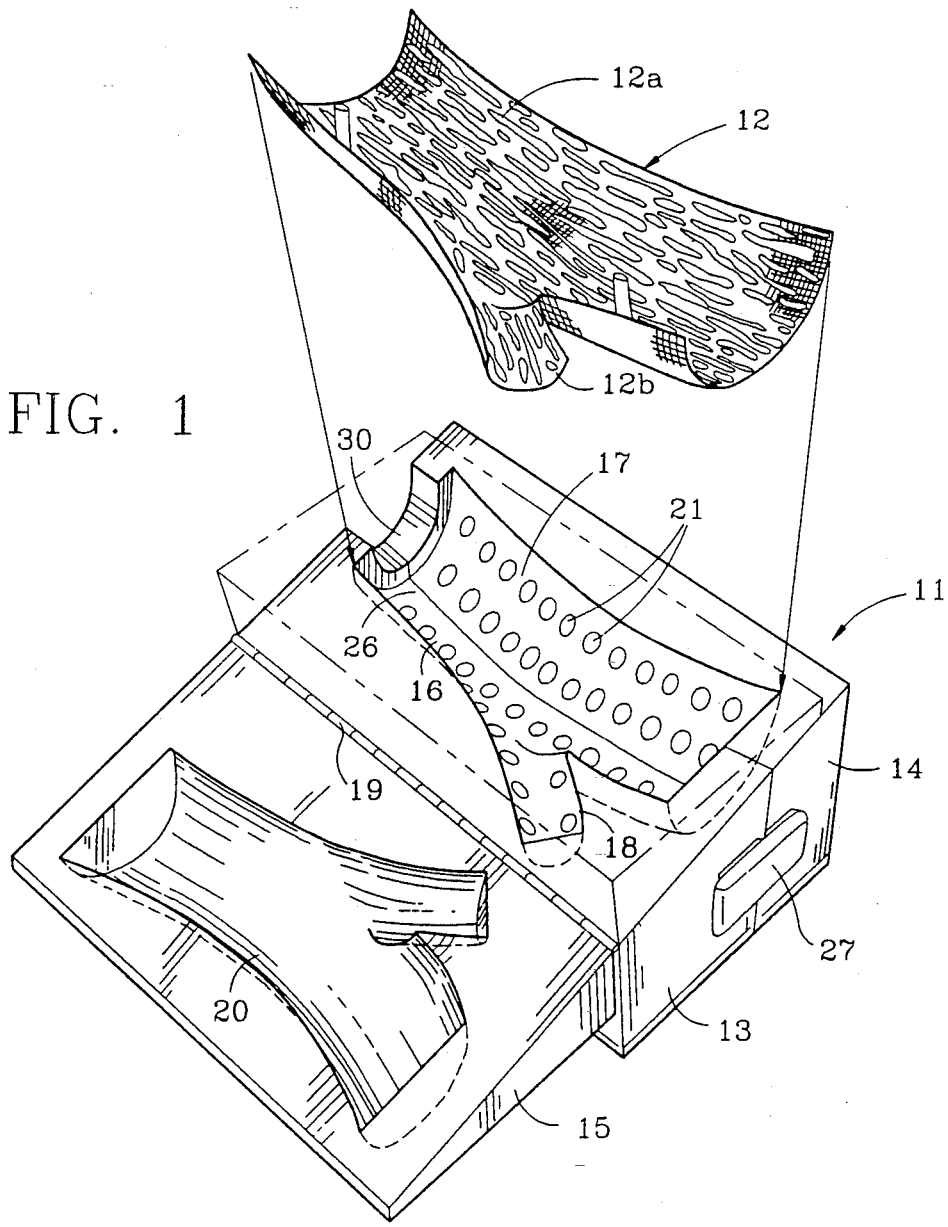
FIG. 1 is a perspective exploded view of an open partible mold and separable flexible porous screen which is placed within the mold interior for practicing the present invention.
Figure 7:
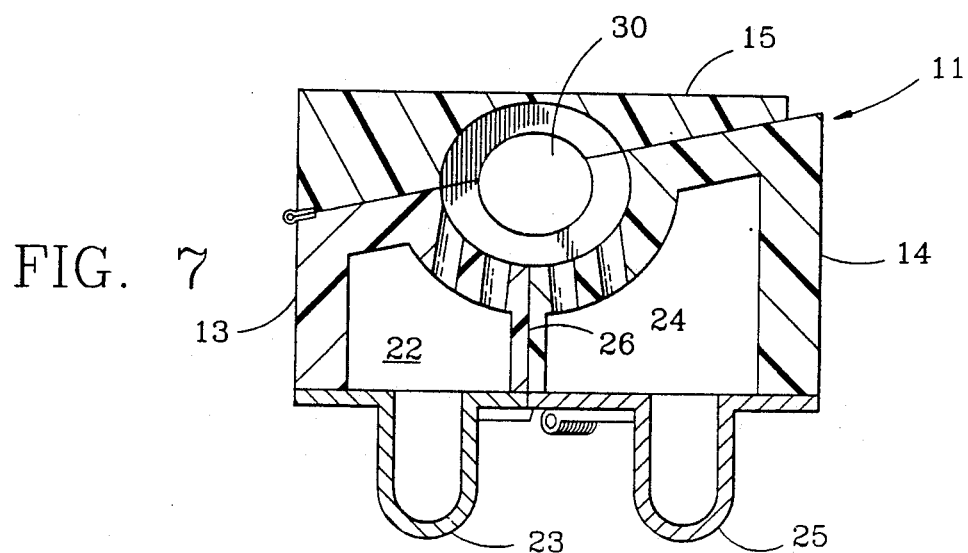
FIG. 7 is a reduced vertical sectional view of the closed mold taken along the line 7—7 of FIG. 4.

As shown in FIG. 1, the patterned screen 12 is formed by taking a porous screen element preferably made from polypropylene mesh having an open mesh of essentially square openings which are about 104 by 104 U.S. mesh size. The originally-flat screen is taken to at least partially surround a naturally occurring log or tree having bark thereon, the exterior bark-laden surface being initially wetted with a spray of water. A layer of moldable synthetic rubber is interposed between the screen member and the wetted bark surface and the screen is forced to adhere to the silicone rubber by light pressure as the screen is wrapped in a curvilinear manner around the log or tree, the rubber being forced into the open interstices of the screen to adhere thereto. The screen 12 is formed having a patterned surface in a reverse image simulating the precise irregular surfaces of the bark-laden log. The moldable synthetic rubber adheres to the screen during its curved formation and does not adhere to the natural bark due to the interposed water layer. The screen is thereby formed having both non-porous and porous surfaces to permit vacuum forming of the log 10 within the mold 11.

The partible mold 11 is rectangular and formed preferably of rigid plastic material having two lower most body members 13 and 14 and a top lid member 15, all three of which have hollow interior surfaces for molding the log. The mold has an outer shell preferably formed of metal and an interior formed of rigid plastic material which may be carved interiorly to form the basic log-shaped cavity. As shown in FIG. 1, the two lowermost body members 13 and 14 of the mold, each have hollow interior generally semi-circular surfaces 16 and 17 respectively, which are essentially semi-circular or slightly greater in shape, having a length and diameter which are selected to form the primary body portion of the log. An extended hollow interior surface 18 is provided within the interior of lowermost body member 13 simulating a side arm or short branch of the log. A semi-circular inlet port 30 is provided in one end of the mold in alignment with the intersection of the two mold parts 13 and 14 for the introduction of the log forming liquid composition during the molding process as described hereinafter. The two body members 13 and 14 are hingedly connected along one bottom edge such as by a piano hinge (not shown).

The lid member 15 of the mold is hingedly connected to lowermost body member 13 of the mold such as by a piano hinge 19, lid member 15 having a hollow interior complementary to the hollow interior of lower most members 13 and 14 such that when the mold is closed, the interior cavity of the mold has a pre-sculpted hollow interior generally complementary to the shape of the mold to be formed. The hollow interior of the lowermost mold body members 13 and 14 has an essentially semi-circular configuration which may be slightly larger than the semi-circular configuration of the log shape of hollow interior 20 of the lid member. The partible screen 12 is a separable member having sufficient flexibility and moldability to be fitted within the lowermost mold body members 13 and 14 in tightly-fitting arrangement and may be removed with the log after forming. The drop-in mesh screen 12 may be formed with or without pull tabs (not shown) for ease of removal of the log from the mold. The log is formed with essentially no parting lines at the mold joints where the separable screen is used to cover such joints.

Figure 2:
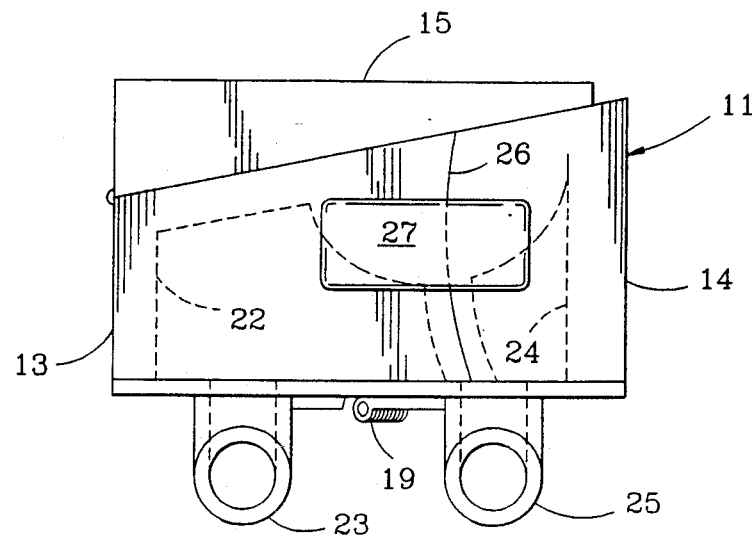
FIG. 2 is a side elevational view of the partible mold shown in FIG. 1, the mold being in closed relation.
Figure 3:
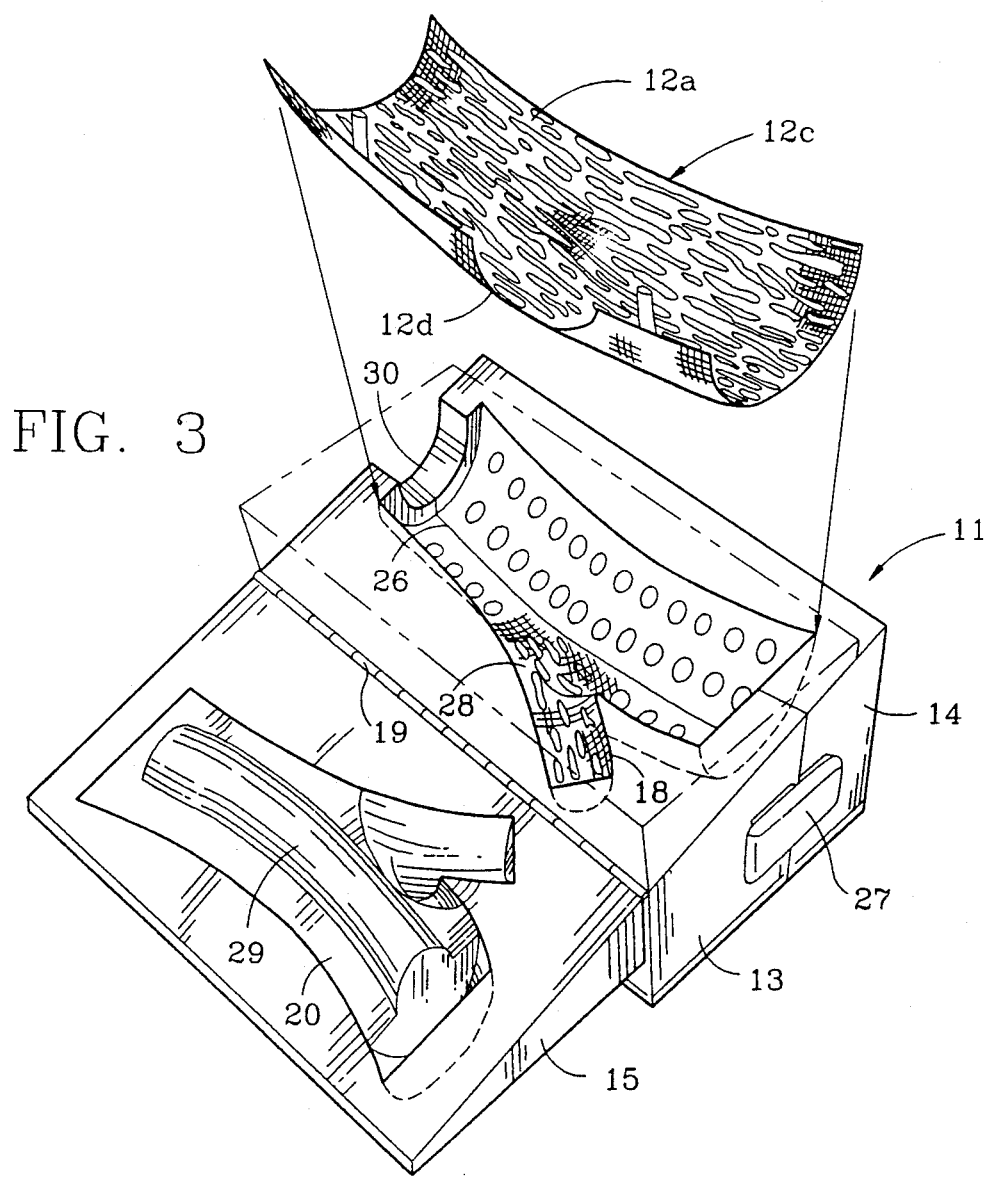
FIG. 3 is a view similar to FIG. 1 showing another embodiment of the partible mold and separable flexible screen similar to those components shown in FIG. 1, the mold being in open relation.
Figure 4:
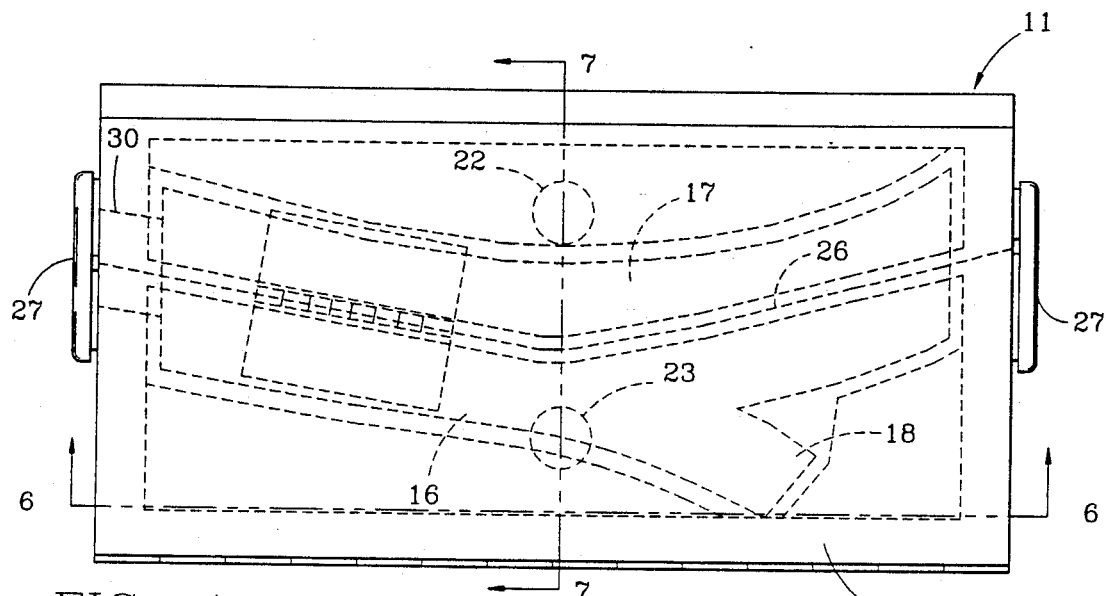
FIG. 4 is an enlarged top plan view of the closed partible mold shown in FIG. 2 ready for the vacuum molding operation.
Figure 5:
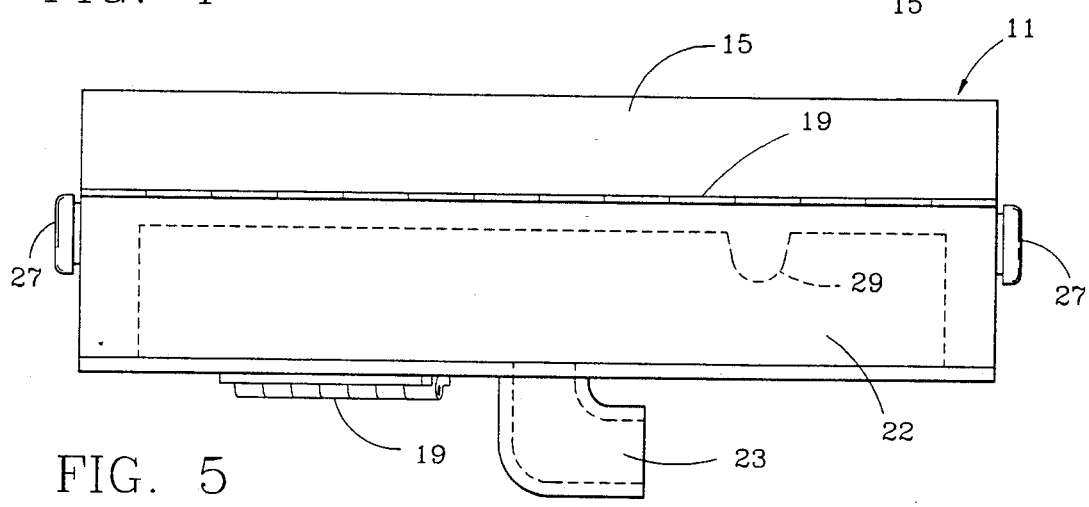
FIG. 5 is an enlarged side elevational view of the closed partible mold shown in FIG. 4.
Figure 6:
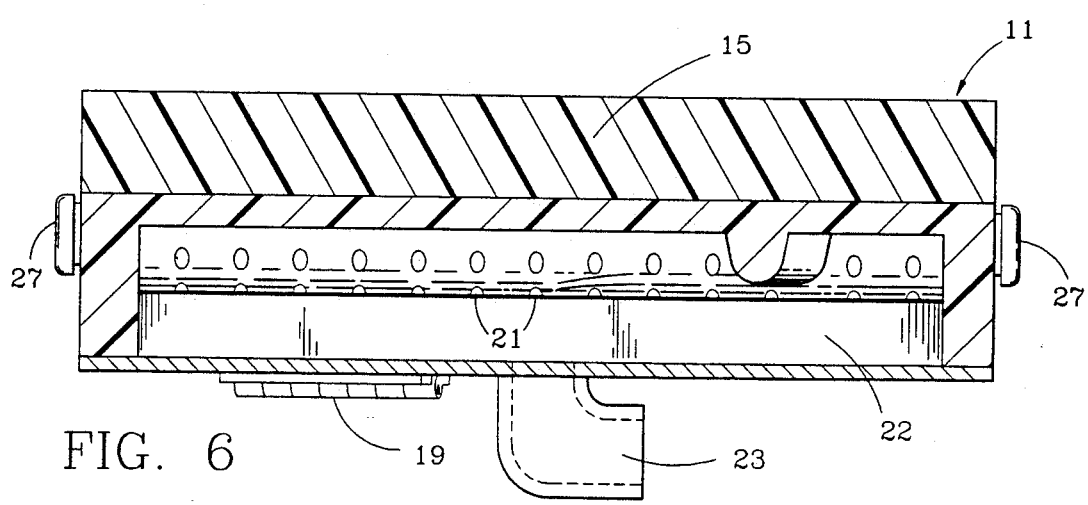
FIG. 6 is an enlarged vertical sectional view of the closed partible mold taken along the line 6—6 of FIG. 4.

The mold as shown in both FIGS. 1 and 3 has a plurality of closely-spaced holes or apertures 21 therein to permit drawing a vacuum on the interior of the mold during the molding operation. The open apertures 21 leading into the interior of the mold, especially within the interior surfaces of lowermost body members 13 and 14, are preferably formed of about 5/8 inch drilled holes which lead into separate vacuum chambers formed in the bottom area of each of the lower mold members 13 and 14. The vacuum chamber 22 in lowermost mold member 13 is shown in FIG. 6. Vacuum chamber 22 has an elbow fitting 23 as shown in dotted outline in FIG. 2 connected thereto which is in turn connected a vacuum source (not shown). As shown in FIG. 2, mold body member 14 also has a separate vacuum chamber 24 which is connected to an elbow fitting 25 which leads to the same vacuum source.

FIG. 2 shows in an end elevational view, body members 13 and 14 having complementary matching vertical surfaces Which are joined in face-to-face relation along the part line 26, the two lowermost mold halves adapted to be joined by mold locking members 27 located at each end of the mold. The two lowermost mold members 13 and 14 are hingedly connected such as by a length of piano hinge, the members 13 and 14 adapted to be separated and opened for removal of the newly-formed log and partible screen as described hereinbelow.

FIG. 1 discloses a first embodiment of the invention wherein the separable patterned screen 12 is formed having the full log body and side arm forming portions 12a and 12b with spaced-apart islands of the moldable silicone rubber projecting upwardly into the log forming space for forming both the log body and the side arm. The flexible screen member 12 is shaped by cutting its perimeter to fit within the closed bottom portion of the mold so that it seats firmly within the hollow interior of body members 13 and 14. The hollow interior of lid member 15 has an essentially full cavity complementary to and juxtaposed from the lower cavities 16 and 17 when closed so that the log may be formed having a essentially round or oval configuration closely approximating the shape of a natural log.

FIG. 2 shows in a side elevational view the three part mold in closed arrangement, the upper surfaces of lower body members 13 and 14 having sloping upper surface configurations residing in the same plane as the hinged lid member 15 swung thereover into closed relation. Thus, the lid member 15 has a tapered lower surface complemental to the upper surfaces of body members 13 and 14. Locking member 27 is shown at one end of the mold in FIG. 2 locking body members 13 and 14 firmly together while lid member 15 closes their upper surfaces and rests thereon by gravity without a positive locking arrangement.

FIG. 3 is view similar to FIG. 1 showing another embodiment of the invention wherein the flexible screen 12c has a pattern of moldable silicone rubber simulating bark which is essentially limited to the body portion of the log. A cutout portion 12d does not extend into the side arm of the log. A permanently-fixed screen element 28 is mounted within the mold in the side arm area 18 which remains fixed within the lower log member 13 for molding the side arm portion of the log. In addition, the lid member 15 of the mold has a raised semi-circular shaped plastic member 29 projecting upwardly and interiorly of the cavity within the lid member to form one side of the log with a hollow essentially semi-circular shaped cavity. Thus, the log is formed with one side of the log having a hollow portion. Such hollow side cavity is normally used in a gas-set facing the bottom or underside portion of a log carrier which is not visible to the observer. Thus, the partible mold 11a shown in FIG. 3 has both a separable flexible porous patterned screen 12c and a fixed patterned porous screen 28 in the side arm area 18 which remains fixed within the mold body member 13 for repeated molding of logs. Thus, the mold is provided with both separable and fixed screen members for log forming, the fixed screen area allowing for more readily removable extraction of the log from the mold in certain log shapes. The modified mold shown in FIG. 3 is thereby capable of forming a larger side arm shaped portion than the mold shown in FIG. 1.

The synthetic log of this invention is preferably formed of aluminosilicate fibers and chromite which constituents in combination provide a dark-colored light-weight heat-resistant log-like element which is especially useful in high-temperature environments.

A preferred composition for forming the log is a water-based solution containing the following constituents in the stated amounts.

500 gals. water
60 lbs. ceramic fiber
2.75 lbs. starch
6.25 Nyacol 2040
3.0 lbs. chromite Obviously the aforesaid formulation may be varied within selected limits depending upon the particular log shape and size to be formed. The stated formulation is particularly desirable for use in the manufacture of smaller to medium sized logs having a diameter ranging from 1 ½ to 5 inches and a length ranging from about 8 to 26 inches, and a density of about 16 pounds per cubic foot. The log may be repeatedly heated and cooled without any appreciable thermal shock or breakage of the log-shaped molded element. The ceramic fiber preferably comprises vitreous aluminosilicate fibers having refractory properties having the following chemical formula $AL_2O_3.SIO_2$ which is amorphous in nature.

Preferably the trademarked material called "FIBERFRAX" ceramic fibers manufactured and sold by The Carborundum Company, Fibers Division, Niagara Falls, N.Y. comprise the major portions of the ceramic log. The ceramic fibers are non-combustible and have a stable reactivity, a melting point temperature of about 3600° F., and a specific gravity of about 2.730 grams per cubic centimeter. The material is stable under normal conditions of use and is soluble in hydrofluoric acid, phosphoric acid and concentrated alkali, but does not produce any hazardous reactions or decomposition products on heating. The subject ceramic fibers are made from alumina and silica and retain their properties up to 2300° F., and under some conditions may be used as high as 3000° F. The fibers are lightweight and resilient, inert to most acids and are unaffected by a hydrogen atmosphere.

The starch component preferably comprises a starch material called "glucoplus No. 110D" made and sold by Chemstar Products Co., Minneapolis, Minn. This product is a white powder having a starch-like odor. Obviously other starch-like materials may be utilized in the composition. The starch improves the handling properties of the composition and the formed log, and possesses a negative charge to facilitate solid formation of the log element.

The Nyacol 2040 is a coloidal silica/sol having a positive charge to improve the adherence of the fibers to each other and improve the handling properties of the resultant molded log. Nyacol 2040 is made and sold by PQ Corp., Valley Forge, Pa. and is a silicon dioxide in the form of an opaque white odorless liquid having a specific gravity of 1.3. It disperses in water, but is negligibly soluble. The solids content of the solution is about 40% by weight.

The chromite component of the formulation is essentially iron chromite ore. A preferred material is Product No. 1308-31-2, manufactured and sold by American Minerals of Camden, N.J. The material has a specific gravity of about 4.3 to 4.5, a melting point of approximately 3800° F., and the appearance of a black aggregate with essentially no odor.

The aforesaid constituents of the formulation may be varied slightly within limits and the composition is particularly useful for vacuum molding into sculpted products having irregular surfaces and good handling properties.

Figure 10:
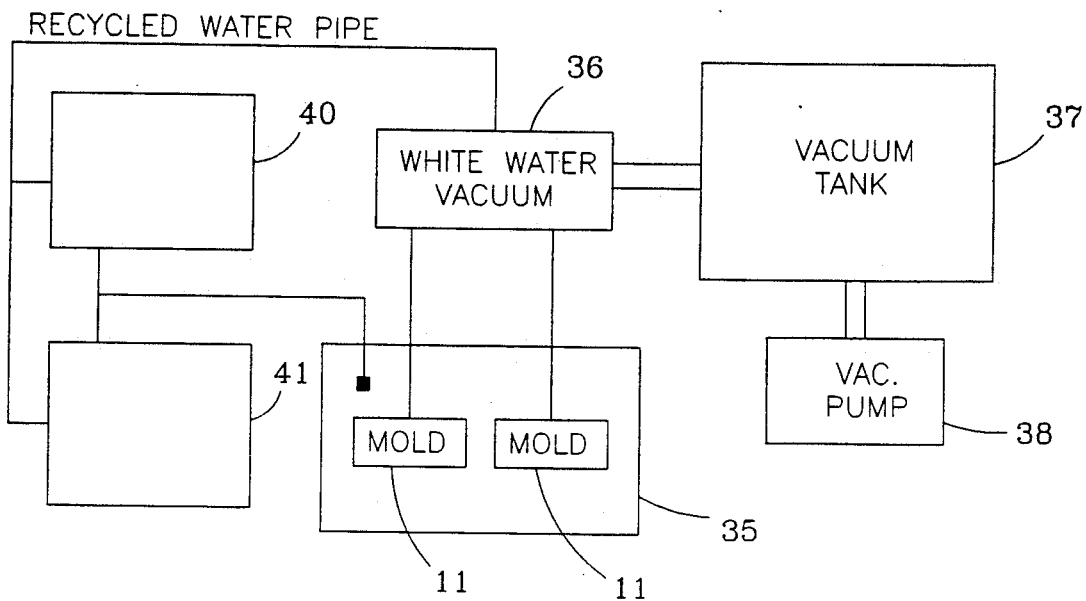
FIG. 10 is a block diagram of the various components of the vacuum molding process utilizing a pair of partible molds as shown in FIG. 1.

The subject process of vacuum forming the ceramic log of this invention is preferably practiced as follows:

A pair of molds 10 both being in close spaced relation is mounted over a casting tank 35 as shown in FIG. 10. The water-based liquid composition having the formulation as aforesaid is maintained within the casting tank to a sufficient depth to permit full immersion of the mold pairs. The molds are suspended in side-by-side relation for complete submersion within the casting tank wherein the liquid composition is drawn into each of the molds through their inlet ports 30. The molds are connected at their bottom region at the elbow fittings by an individual flexible vacuum line which extends to a white water tank 36. The vacuum is maintained within the white water tank by a separate vacuum tank 37 and vacuum pump 38, the vacuum tank being connected directly to the white water vacuum chamber 36. With the molds submerged within the casting tank, the vacuum force is applied to withdraw the liquid component from the solution, depositing the solid components of the casting formulation within the interior of each mold. The white water extracted from the molds and contained in the white water tank 36 is recycled to a pair of reformulating tanks or chambers 40 and 41 which are employed to reformulate the water-based casting composition for delivery to the casting tank 35 as required. A vacuum is applied to each of the molds at a negative pressure ranging from about 5 to 20 inches of mercury for a time period ranging from about one to three minutes during which time the solid log is formed within each mold. The closed cycle for the white water permits reformulation of the casting formulation in each of the two reformulation tanks 40 and 41 in order to maintain an essentially uniform casting composition within the casting tank. Following the application of vacuum and complete formulation of the logs within each of the molds, the molds are elevated above the tank and liquid components are allowed to drain back from the molds into the casting tank 35 while the molds are held stationarily thereabove.

Figure 11:
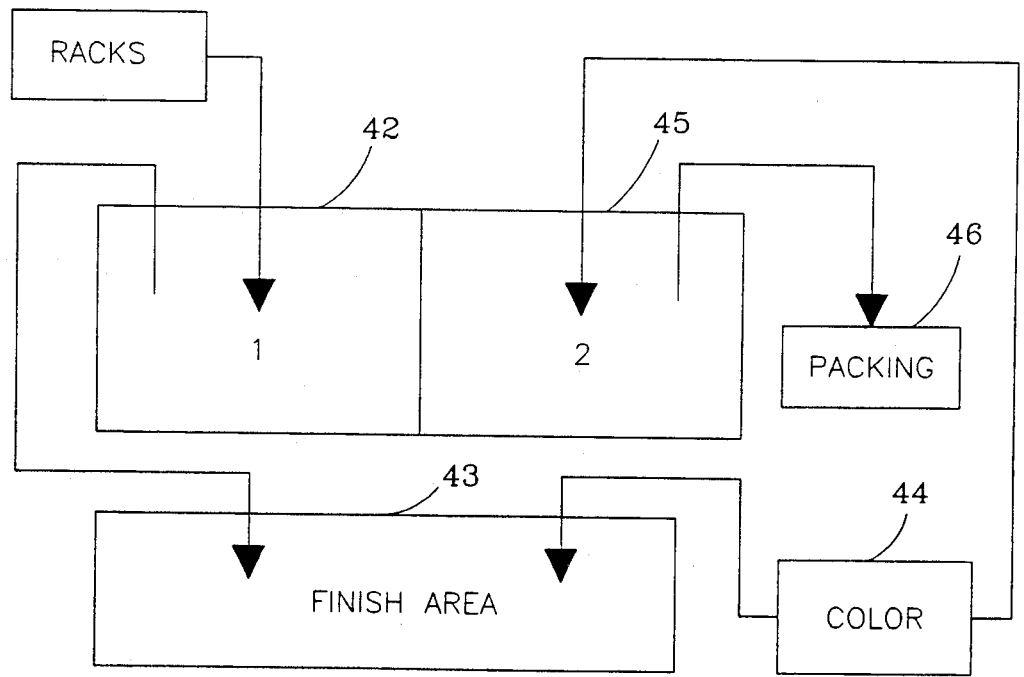
FIG. 11 is a block diagram of further components of the subject process for finishing the ceramic logs.

The molds are then taken to the finishing area as shown in the block diagram of FIG. 11. The molds are opened and the separable porous screen and newly-formed log are removed from the mold and the logs are placed on drying racks adapted to hold a plurality of the logs in spaced-apart relation. The separable screen may be used repeatedly to mold additional logs without losing its roughned surface definition. A plurality of the newly-formed logs are introduced into a first drying chamber 42 for a period ranging from at least about 4 to 6 hours at a temperature ranging from about 225 to 300° F. to thoroughly dry the logs and increase their structural strength. After the initial drying period, the logs are taken to a finishing area designated by the numeral 43 where the sprue portions of the logs are removed such as by cutting and filing as required. The primary portion of sprue is the cylindrical projection formed by the inlet port 30 of the mold which is removed to give the log an essentially square end configuration. The logs are then taken to a colorizing tank 44 which contains a water-based coloring solution which ranges from brown to gray to black depending upon the desired finished colors of the logs.

A preferred colorizing formulation comprises the following formula:
200 gals. water
51.0 lbs. chromite
11.0 lbs. colorant In order to obtain a brown coloration, Product No. GC790 is used, and in order to obtain a black coloration, Product No. GC704 is used. Both colorants fall in the pigment class of chrome, iron, manganese, brown spinel having a basic chemical formula as follows (FE,MN)(FE,CR,MN) 204. The pigment structure is basically a spinel. The colorants both have a density greater than that of water and are very slightly soluble in water. Both colorants are products of General Color and Chemical Company of Minerva, Ohio.

After colorizing the dried and finished logs, the colorized logs which have been treated in the water-based colorizing solution are again dried in a second drying chamber 45 for a second drying period which is comparable to the first i.e. at least about 4 to 6 hours at a temperature ranging from 225 to 300° F. following which the newly colorized logs are ready for packing and use in a wide variety of applications.

The process provides an improved vacuum dispersion concept since the vacuum chambers do not fully surround all of the mold interior surfaces. The incorporated removable parts of the mold allow for forming cut-outs, locator tabs, burned-out areas, etc. in the molded log. The mold consists essentially of abrasion-resistant fast-set pourable casting resin to form a lightweight plastic die body.

Accordingly, the improved process and partible mold are simplified, provide an effective, safe, inexpensive, and efficient method and apparatus which achieves all the enumerated objectives, provides for eliminating difficulties encountered with prior art devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved process and mold are constructed and used, the characteristics of the construction, and the advantageous, new and useful results obtained; the new and useful structures, devices, elements, arrangements, parts and combinations, are set forth in the appended claims.

I claim:

1. The process of forming a synthetic ceramic log for use in natural gas, propane and wood-burning fireplaces and stoves, said process comprising the steps of forming a flexible porous patterned screen simulating the exterior bark of a tree having a reverse image, placing said flexible porous patterned screen in a porous partible hollow mold in separable relation, closing said partible mold and introducing a water-based liquid composition containing ceramic fibers into said partible hollow mold, vacuum molding said ceramic log within said partible hollow mold by extracting water from said liquid composition contained within said mold, opening said partible mold and removing said ceramic log therefrom, drying said ceramic log at an elevated temperature during a first drying step to increase its structural strength, and finishing said ceramic log by removing its sprue portions.

2. The process in accordance with claim 1, including the step of immersing said closed partible mold in said water-based liquid composition containing vitreous aluminosilicate ceramic fibers and depositing said ceramic fibers within said mold by vacuum forming to form a substantially solid ceramic log.

3. The process in accordance with claim 1, including the step of colorizing said ceramic log after said first drying step with a water-based colorizing solution, and further drying said colored ceramic log during a second drying step.

4. The process in accordance with claim 1, wherein said porous partible hollow mold has at least a partial fixed screen-lined interior surface, and applying a vacuum to said partible mold and said separable interior porous patterned screen to withdraw water from said mold to form said ceramic log.

5. The process in accordance with claim 1, wherein said flexible porous patterned screen has a porosity of about 104 U.S. mesh size.

6. The process in accordance with claim 1, including the step of forming said ceramic log with a hollow interior cavity on one side thereof.

7. The process in accordance with claim 1 including the step of forming said ceramic log with a substantially solid body and major exterior surfaces simulating a natural log having bark thereon.

8. The process in accordance with claim 1, wherein said flexible porous patterned screen is formed of polypropylene mesh material having a porosity of about 104 U.S. mesh size and spaced-apart islands of tree bark formed on said patterned screen from moldable silicone rubber.

9. The process in accordance with claim 1, including the step of colorizing said ceramic log to an exterior surface color ranging from brown to gray to black.

10. The process in accordance with claim 1, wherein said newly-formed ceramic log is dried at a temperature ranging from about 225° to 300° F. for a period of at least about 6 hours during the first drying step.

11. The process in accordance with claim 3, wherein said colorized ceramic log is dried during the second drying step at a temperature ranging from about 225 to 300° F. for at least about 6 hours.

12. The process in accordance with claim 2, including the step of applying a low-pressure vacuum force ranging from about 5 to 20 inches of mercury to the interior of said partible mold for a period ranging from 1 to 3 minutes to form said ceramic log within said ceramic log within said separable porous patterned screen.

* * * * *